July 5, 1955

D. BLITZ 2,712,625

MOTOR SPEED REGULATION SYSTEM UTILIZING
NONLINEAR IMPEDANCE DEVICES

Filed July 14, 1951

INVENTOR
DANIEL BLITZ
BY
ATTORNEY

_United States Patent Office_ 2,712,625
Patented July 5, 1955

2,712,625
MOTOR SPEED REGULATION SYSTEM UTILIZING NONLINEAR IMPEDANCE DEVICES

Daniel Blitz, Boston, Mass., assignor to Raytheon Manufacturing Company, Newton, Mass., a corporation of Delaware Application July 14, 1951, Serial No. 236,762

1 Claim. (Cl. 318—331)

This invention relates to voltage regulators and more particularly to voltage regulator circuits of the type utilizing devices having a nonlinear impedance.

It is well known that certain conducting devices do not conduct currents at a constant ratio to the voltage applied across them. Such devices usually conduct practically no current until a certain minimum potential is applied across them, and then their resistance rapidly declines with the voltage applied across them. This invention makes use of the nonlinear conducting characteristics of such devices. Such devices are designed for operation with low voltage across them and large currents through them. Thus they may be used in devices where the electronic types of voltage regulators with their high voltage and low current characteristics are inappropriate.

By the present invention, such devices are either connected in parallel or in series with a load device. With the parallel connection when the voltage drop across the load exceeds the potential necessary to cause the devices to conduct, the excess current that would ordinarily pass through the load will be diverted through the parallel circuit including the devices, and the voltage drop across the load will not exceed a predetermined value. With the series arrangement if the voltage drop across the load exceeded the difference between the supply voltage and the sum of the voltage needed to initiate conduction in the devices, they would not conduct as the potential across them would not be sufficient to sustain conduction. This would cut off current to the load device and there would be no voltage drop across the load so this condition is impossible and the voltage drop across the load cannot exceed a predetermined value. When the load of such a circuit is the armature of a motor, the circuit may be used as a speed control for the motor. It will be seen that with the circuit of the present invention the regulating devices only carry the load current except for very short periods of time thus saving power over more conventional types of regulating circuits.

Other and further advantages of this invention will be apparent as the description thereof progresses, reference being had to the accompanying drawings, wherein.

Figure 1:
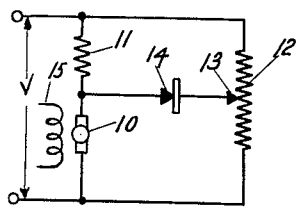
Fig. 1 is a schematic diagram of a circuit applying the invention to the regulation of the speed of a D. C. motor.

In Fig. 1, the reference numeral 10 refers to the armature of a motor connected in series with a resistor 11 across a source of potential. A bias potentiometer or voltage divider 12 is also connected across the source of potential. The arm 13 of this potentiometer is connected through a nonlinear conducting device 14, such as a selenium rectifier or diode, either vacuum or gaseous, to the armature 10. The field winding associated with the armature 10 is shown as 15.

Figure 2:
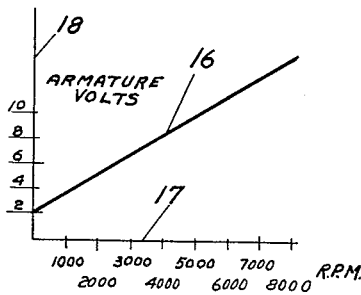
Fig. 2 is a graph showing the relation between speed and armature voltage of a motor.

Fig. 2 shows a graph 16 of the variation of the voltage across the armature 10 with speed. The various speeds up to 8,000 r. p. m., for example, are shown along the horizontal axis 17. The various armature voltages, up to ten volts in this example, are shown along the vertical axis 18. It will be noted that the voltage across the armature 10 at rest has been indicated as two volts.

Figure 3:
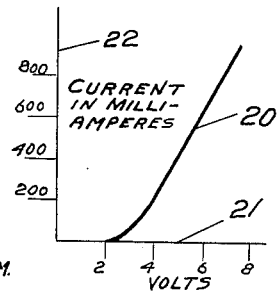
Fig. 3 is a graph showing the relation between the voltage across a nonlinear conducting device and the current through it.

Fig. 3 shows a graph 20 of the variation of the current through the nonlinear conductor 14 with the voltage across it. The various voltages, up to eight volts in this example, are shown along the horizontal axis 21, and the various currents up to 800 milliamperes are shown along the vertical axis 22. It will be noted that the conductor 14 starts to conduct at two volts in this example.

In operation the motor will start running when energized and as the speed increases the armature voltage will rise as shown on the graph 16. The right hand terminal of the conductor 14 is held at a certain portion of the supply voltage determined by the position of the arm 13 of the potentiometer 12. When the voltage across the armature 10 is less than the potential on arm 13 of the potentiometer 12, the conductor conducts no appreciable amount of current and the motor speed can increase which, in turn, increases the voltage across the armature 10 as shown in the graph in Fig. 2. When a speed is reached at which the armature voltage exceeds the voltage at which the nonlinear conductor 14 as biased by the potential on the arm 13 will conduct an appreciable amount of current, the conductor 14 begins to conduct with decreasing impedance. This conduction causes a greater drop in the resistor 11 which reduces the voltage across the armature and prevents the speed of the motor from increasing further. Should the load increase, the motor will slow down and the armature voltage will drop below the point at which the conductor will conduct permitting the entire current from the supply to flow through the armature 10 causing the motor to speed up until the voltage across it increases to a point where the conductor conducts again.

Thus the motor speed can be readily controlled by adjusting the arm 13 of the bias potentiometer 12. A very fine control can be obtained because of the sharp slope of the conductor characteristic above the initial conduction point, as seen from Fig. 3. Until the preset speed is reached, the armature receives its full current and thus has its full starting torque regardless of how slow the speed is set. Only when the desired speed is reached does the conductor draw an appreciable amount of current, thus effectively reducing the armature current by any amount necessary to maintain the desired speed.

Any load device may be substituted for the armature 10. The setting of the arm 13 of the potentiometer 12 will maintain the voltage across it constant as the load conditions vary.

Figure 4:
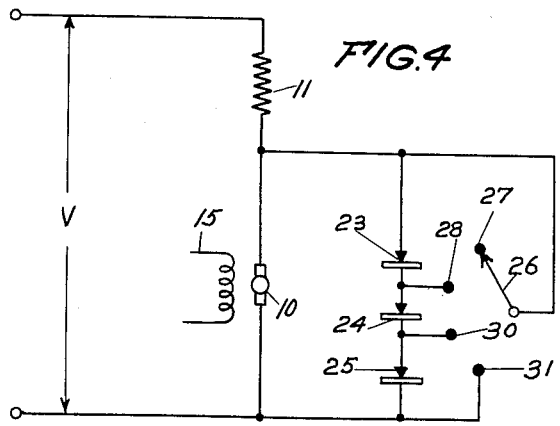
Fig. 4 is a schematic diagram of another circuit applying the principle of the invention to the regulation of the speed of a D. C. motor.

Fig. 4 shows a modification in which a plurality of nonlinear conductors 23, 24 and 25 is connected in series across the armature 10, or other load, and the end of the series of conductors that is connected to the armature 10 is also connected to the arm 26 of a switch. The contacts 28, 30 and 31 of the switch are each connected to the negative terminals of a conductor. The contact 27 is left unconnected. The effect of the switch arm 26 is to determine how many of the conductors 23, 24 and 25 are connected across the armature 10. Each conductor has a certain required minimum potential to initiate conduction. The number of conductors connected across the armature 10, or the load, by the switch 26 determines the voltage to which the armature will be brought, and at which it will be maintained. This, in turn, determines the speed of the armature. When the arm 26 is at contact 27, the armature is maintained at a potential equal to three times the initial conduction potential of one such conductor, and at contact 28 at that of two conductors, and at contact 30 at that of one such conductor. As before, when the total of the initial conduction voltages of the conductors in the circuit is exceeded, they will conduct bleeding-off current, increasing the voltage drop through the resistor 11 until the voltage across the armature 10 is reduced below the point where all the conductors in the circuit will conduct. If the field 15 is saturated or formed of a permanent magnet, speed is independent of load or supply voltage. The speed can also be controlled by varying the field strength independently of the load. Any load may be substituted for the armature 10, with the result that the voltage across the load will remain substantially constant with variations in supply voltage V.

Figure 5:
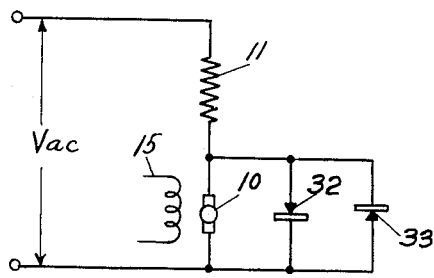
Fig. 5 is a schematic diagram of still another circuit applying the principle of the invention to the regulation of an A. C. motor.

Fig. 5 shows how the principle of this invention may be applied to an A. C. motor, or to a load. The arrangement is similar to that of Fig. 4 except that two conductors are employed. One, 32, is arranged in one polarity, and the other, 33, is arranged in the opposite polarity so that current will flow through one conductor or the other, depending on the alternation of the alternating current. While only a single conductor arranged in each polarity is indicated, a series of such conductors may be arranged to be introduced successively into the circuit by a switching arrangement, such as that shown in Fig. 4. Except for the two sets of unilateral conductors 32 and 33, the operation of this circuit is the same as that of the circuit shown in Fig. 4.

This same arrangement may be used with a D. C. motor or load that has provisions for reversing the polarity of its input. The conductor 32 will be effective with one polarity of the input, or when the motor is to rotate in one direction, and conductor 33 when the input is in the other polarity, or when the motor is reversed.

Figure 6:
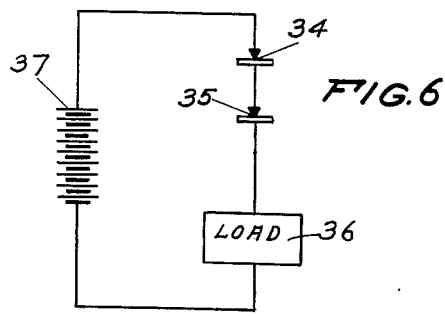
Fig. 6 is a schematic diagram of another circuit applying the principle of the invention to the regulation of any load device.

Fig. 6 shows a further modification of the invention for regulating the voltage across a varying load. A string of conductors 34 and 35 is connected in series with a load device 36 across a source of potential 37.

The operation of this circuit can best be explained by assuming certain voltage values. Assume the source of potential to deliver nineteen volts and the load to be maintained at a nine volt drop and that each conductor requires five volts for initial conduction. When the load conditions are such that a current sufficient to produce a nine volt drop in the load will be produced, there will be a ten volt drop across the conductors 34 and 35 permitting them to conduct. Should the load 36 change its impedance so as to draw a different current, the voltage drop through the conductors 34 and 35 will remain substantially constant, with the result that the voltage across the load 36 will also remain constant. Thus the load cannot draw more than enough current to produce a ten volt drop. The load in this circuit could, of course, be the armature of a motor as shown in the other circuits.

The fact that the voltage drops across the conductors 35 and 36 are constant in the series arrangement of Fig. 6 makes this circuit useful in a D. C. amplifier where changes in level of a relatively high voltage are of interest. Such a circuit could be used to cut off most of such a voltage while accurately transmitting the variations. In this case, the source 37 would generate varying D. C. and the load 36 would be the grid circuit of a D. C. amplifier.

This invention is not limited to the particular details of construction, materials and processes described, as many equivalents will suggest themselves to those skilled in the art. It is accordingly desired that the appended claim be given a broad interpretation commensurate with the scope of the invention within the art.

What is claimed is:

In a motor speed control, the combination of a source of potential, an armature connected in series with an impedance across a source of potential and shunted by a voltage divider, a nonlinear unidirectional conducting device having the property of conducting appreciable current only when a voltage above a minimum value is applied across it, and means for connecting said conducting device between the junction of said impedance and said armature and to a point on said voltage divider.

References Cited in the file of this patent

UNITED STATES PATENTS

| | | |
|---|---|---|
| 1,855,736 | White | Apr. 26, 1932 |
| 1,961,940 | O'Hagan | June 5, 1934 |
| 1,966,558 | O'Hagan | July 17, 1934 |
| 2,558,094 | King | June 26, 1951 |

FOREIGN PATENTS

| | | |
|---|---|---|
| 114,695 | Sweden | Aug. 21, 1945 |
| 432,203 | Great Britain | July 22, 1935 |
| 502,449 | Germany | July 19, 1930 |